United States Patent
Crump

(10) Patent No.: US 6,398,266 B1
(45) Date of Patent: Jun. 4, 2002

(54) COLLAPSE RESISTANT POPOID CONNECTOR

(75) Inventor: Chet M. Crump, Draper, UT (US)

(73) Assignee: Ballard Medical Products, Draper, UT (US)

(*) Notice: Subject to any disclaimer, the term of this patent is extended or adjusted under 35 U.S.C. 154(b) by 0 days.

(21) Appl. No.: 09/401,397

(22) Filed: Sep. 22, 1999

(51) Int. Cl.⁷ .................................................. F16L 21/00
(52) U.S. Cl. ....................... 285/226; 285/423; 138/121
(58) Field of Search ................................. 285/226, 423; 92/34; 138/121; 128/207.15, 207.14

(56) References Cited

U.S. PATENT DOCUMENTS

| | | | |
|---|---|---|---|
| 2,453,475 A | 9/1948 | Tobias | 128/29 |
| 3,202,150 A | 8/1965 | Miller | 128/142 |
| 3,219,034 A | 11/1965 | Kalenik | 128/147 |
| 3,273,916 A | 9/1966 | Tillery | 285/226 |
| 3,319,532 A * | 5/1967 | Pridham | |
| 3,388,705 A | 6/1968 | Grosshandler | 128/351 |
| 3,409,224 A | 11/1968 | Harp et al. | 239/33 |
| 3,714,944 A | 2/1973 | Price et al. | 128/209 |
| 3,856,051 A | 12/1974 | Bain | 138/114 |
| 4,113,828 A * | 9/1978 | Kramer, Sr. et al. | 138/21 |
| 4,328,798 A | 5/1982 | Isaacson | 128/202.27 |
| 4,385,629 A | 5/1983 | Wolf, Jr. et al. | 128/207.14 |
| 4,392,490 A | 7/1983 | Mattingly et al. | 128/202.27 |
| 4,516,573 A | 5/1985 | Gedeon | 128/203.13 |
| 4,593,690 A * | 6/1986 | Sheridan et al. | 285/226 |
| 4,621,634 A | 11/1986 | Nowacki et al. | 128/204.18 |
| 4,784,639 A | 11/1988 | Patel | |
| 4,787,655 A | 11/1988 | Gross et al. | |
| 4,846,510 A * | 7/1989 | Mikol | 285/226 |
| 4,852,564 A * | 8/1989 | Sheridan et al. | 285/226 |
| 4,921,147 A | 5/1990 | Poirier | 222/527 |
| 4,927,191 A * | 5/1990 | Mikol | 285/226 |
| 5,027,809 A | 7/1991 | Robinson | 128/203.24 |
| 5,121,746 A | 6/1992 | Sikora | |
| 5,284,160 A | 2/1994 | Dryden | |
| 5,311,753 A | 5/1994 | Kanao | |
| 5,333,608 A | 8/1994 | Cummins | |
| 5,363,882 A * | 11/1994 | Chikama | 138/21 |
| 5,377,670 A | 1/1995 | Smith | 128/204.17 |
| 5,386,826 A | 2/1995 | Inglis et al. | 128/207.14 |
| 5,404,873 A | 4/1995 | Leagre et al. | 128/204.18 |
| 5,431,157 A | 7/1995 | Mourkidou et al. | |
| 5,431,637 A * | 7/1995 | Okada et al. | 138/21 |
| 5,482,089 A | 1/1996 | Weber et al. | |
| 5,507,319 A | 4/1996 | Kanao | |
| 5,540,221 A | 7/1996 | Kaigler et al. | |
| 5,546,934 A | 8/1996 | Kaigler et al. | |
| 5,558,371 A | 9/1996 | Lordo | |
| 5,569,159 A | 10/1996 | Anderson et al. | |

(List continued on next page.)

FOREIGN PATENT DOCUMENTS

| FR | 2677688 A | 12/1992 |
|---|---|---|
| GB | 2124716 A | 2/1984 |
| GB | 2298470 A | 9/1996 |

OTHER PUBLICATIONS

European Patent Office Search Report Jan. 24, 2001.

*Primary Examiner*—Lynne H. Browne
*Assistant Examiner*—Tomlyne A Malcolm
(74) *Attorney, Agent, or Firm*—Dority & Manning, P.A,

(57) ABSTRACT

A popoid connector for use with other medical devices such as tracheal tubes, intubation tubes and aspiration and ventilation systems comprises a plurality of saucer shaped members each having a first portion and a second portion to form a corrugated portion along the connector. On side of each of the saucer shaped members is provide with at least one circumscribing reinforcing rib to provide additional structural support for the popoid connector. The reinforcing ribs are integrally formed with the popoid connector. The reinforcing ribs inhibit transverse collapsing of the popoid connector add rigidity to the popoid connector when the popoid connector is in a bent position.

24 Claims, 5 Drawing Sheets

U.S. PATENT DOCUMENTS

| | | | |
|---|---|---|---|
| 5,632,734 A | 5/1997 | Galel et al. | |
| 5,680,859 A | 10/1997 | Urion et al. | |
| 5,688,121 A | 11/1997 | Davis | |
| 5,720,656 A | 2/1998 | Savage | 454/119 |
| 5,735,266 A * | 4/1998 | Smith | 138/21 |
| 5,741,134 A | 4/1998 | Davis | |
| 5,807,354 A | 9/1998 | Kenda | |
| 5,823,184 A | 10/1998 | Gross | 128/294.18 |
| 5,864,938 A | 2/1999 | Gansel et al. | |
| 5,866,853 A | 2/1999 | Sheehan | |
| 5,891,110 A | 4/1999 | Larson et al. | |
| 5,897,537 A | 4/1999 | Berg et al. | |
| 5,901,705 A | 5/1999 | Leagre | 128/207.14 |
| 5,908,446 A | 6/1999 | Imran | |
| 5,911,715 A | 6/1999 | Berg et al. | |
| 5,938,587 A * | 8/1999 | Taylor et al. | 138/21 |
| 5,944,697 A | 8/1999 | Biche | |
| 5,951,489 A | 9/1999 | Bauer | |
| 5,957,134 A | 9/1999 | Lee | |
| 5,957,941 A | 9/1999 | Ream | |
| 5,996,581 A | 12/1999 | Duch | |
| 6,007,370 A | 12/1999 | Langridge | |
| 6,009,872 A | 1/2000 | Delaplane et al. | |
| 6,014,972 A | 1/2000 | Sladek | |
| 6,016,800 A | 1/2000 | Century | |
| 6,017,331 A | 1/2000 | Watts et al. | |
| 6,152,931 A | 11/2000 | Nadal et al. | |

* cited by examiner

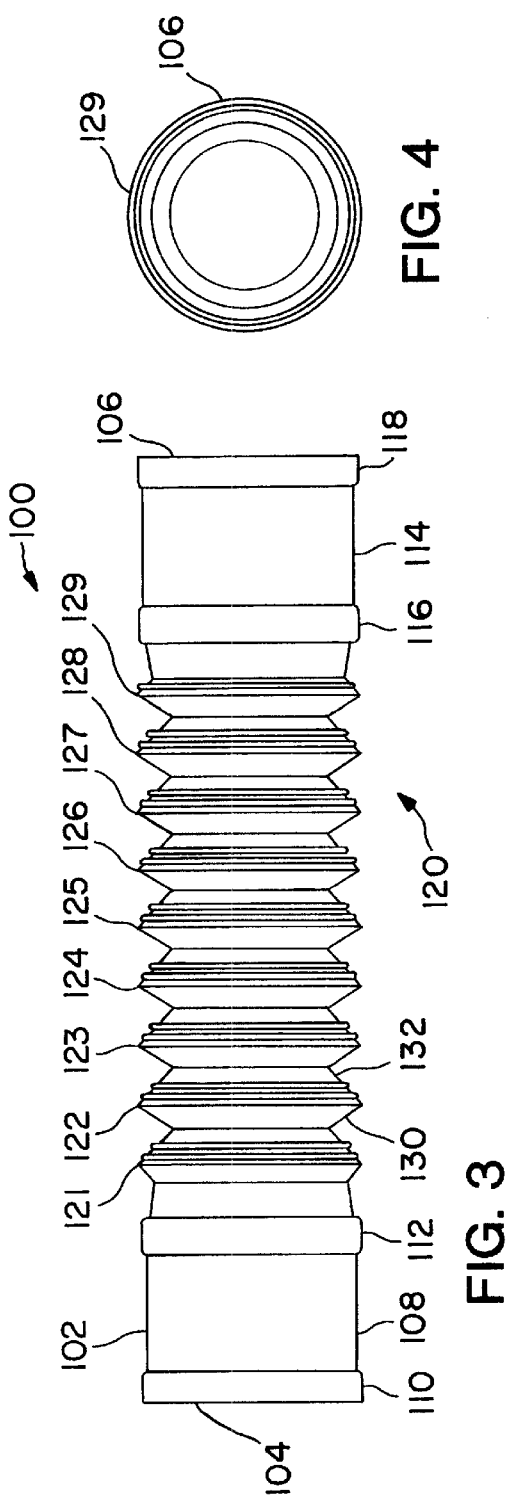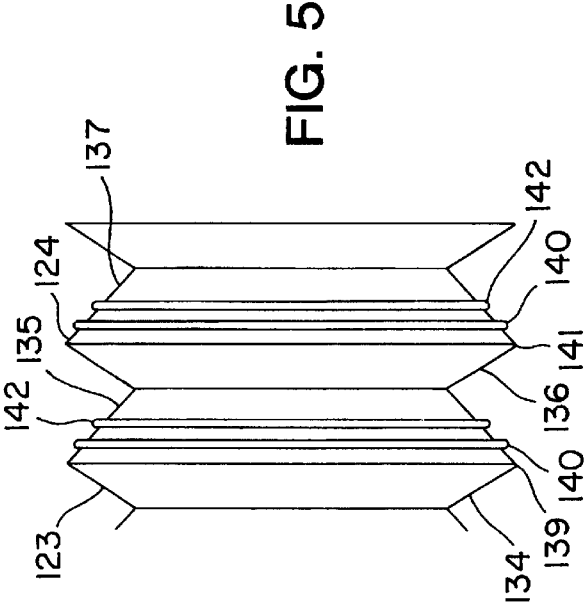

COLLAPSE RESISTANT POPOID CONNECTOR

BACKGROUND

1. Field of the Invention

This invention relates generally to connectors for various tubular medical devices, and, more specifically, to a popoid type connector that is capable of being bent relative to a longitudinal axis thereof and is configured to maintain the bent position.

2. Background of the Invention

Popoids are typically formed into plastic tubing to allow bending of the plastic tubing without causing the plastic tubing to kink. A popoid is generally comprised of a plurality of saw tooth sections that are circumferentially formed into the wall of the tubing. When collapsed, each saw tooth section abuts against and fits slightly within the adjacent saw tooth section effectively shortening the length of tubing from which the popoid is formed. In an expanded position, the popoid is capable of bending in any direction (i.e., 360 degrees) relative to the longitudinal axis of the tubing in which the popoid is formed and will generally hold its bent position when released.

Popoid devices are used in many applications both inside and outside the medical industry. For example, plastic drinking straws have been available for many years that include a popoid section proximate the drinking end thereof to allow the straw to bend along the popoid section and thus maintain its bent shape when released. In the medical industry, popoid devices have been developed for use where typically more rigid tubing devices require bending or flexing without causing the tubing to become kinked. For example, endotracheal tubes are typically formed from a sufficiently rigid plastic material to maintain an open airway through the trachea of a patient. The proximal end of such an endotracheal tube is often connected to other sections of tubing outside the patients body. In order to place less stress on the endotracheal tube as it exits the patient and thus increase patient comfort, connectors have been developed that utilize a popoid section to join the endotracheal tube with another external section of tubing. These popoid connectors allow an abrupt bend to be made in the tubing connected to the endotracheal tube proximate the end of the endotracheal tube exiting the patent that places the least amount of force on the proximal end of the endotracheal tube. Such popoid connectors are also advantageous for use in conjunction with other medical devices such as those used for intubation applications as well as in various breathing circuits for aspiration and/or ventilation.

Tubular popoid connectors are typically formed from extruded sections of plastic tubing. Often, shortly after extrusion, the sections of plastic tubing are placed within a mold. Because the sections of plastic tubing are placed within the mold shortly after extrusion, the sections of tubing are still in a pliable state and have thus not yet complete solidified. As such, the sections of tubing are amenable to being molded. The molds include recesses formed therein that are configured to define the popoid connector Such molds are generally formed from two matching half molds, each of which define a plurality of semicircular recesses as well as the other desired features of the popoid connector. When mated, the two matching half molds form the complete desired shape of the popoid connector.

As each section of tubing is placed within the mold, the tubing is forced into the recesses of the mold to cause the tubing to form to the inside of the mold. Such force is usually applied by using suction on the external surfaces of the tubing to draw the tubing into the recesses of the mold, or by pressurizing the inside of the section of tubing to cause the tubing to expand into the internal recesses of the mold. Because the section of tubing is often comprised of a relatively thin walled, plastic material, the section of tubing rapidly cools to rigidly maintain the shape of the mold upon its release from the mold.

FIGS. 1 and 2 illustrate a popoid connector, generally indicated at 10, known in the art. The popoid connector 10 is comprised of a generally elongate tubular member having a distal end 12 and a proximal end 14. A first connection end 16 is provided at the distal end 12 and includes various features 18, 20, 22 and 24 for connecting to another device, such as an endotracheal tube (not shown). Likewise, the proximal end 14 has a similarly configured second connection end 26 that includes features 28, 30, 32, and 34 for attachment to another medical device.

Interposed between the first and second connecting ends 16 and 26, respectively, is a popoid section, generally indicated at 38. The popoid section 38 is comprised of a plurality of corrugations 40–47 that have a configuration which allows the popoid section 38 to bend and retain its bent orientation when released. Each corrugation 40–47 is comprised of a pair of oppositely facing frustoconical sections, such as the frustoconical sections 48 and 50 of corrugation 41. While the largest and smallest diameters of the frustoconical sections 48 and 50 are the same, the longitudinal length of each frustoconical section 48 and 50 is different. In this example, the frustoconical portions 48 nearest the distal end 12 of each corrugation 40–47 have a greater longitudinal length than the longitudinal length of the frustoconical sections 50 nearer the proximal end 14. When the distal end 12 is forced toward the proximal end 14 along the longitudinal axis of the connector 10, the frustoconical portions 48 substantially maintain their shape, while the frustoconical portions 50 become inverted to fit within the associated frustoconical portions 48. Thus, the popoid section 38 will collapse upon itself to shorten the length of the connector 10. A similar condition occurs when the popoid section 38 is bent in a direction relative to the longitudinal axis of the connector 10. As the popoid section 38 is bent, the sides of the frustoconical portions 48 and 50 on the side of the popoid section that are in the direction of the bend will fold upon themselves to shorten the length of the popoid along that side. Conversely, the frustoconical portions 48 and 50 that are on the opposite side to the direction of the bend maintain their pre-bent arrangement such that the length of the popoid section 38 along this side of the popoid section 38 maintains its length.

In order for the popoid to function properly, the frustoconical sections 50 must be able to flex relative to the frustoconical sections 48 to be able to invert when the popoid section 38 is bent or collapsed and maintain their position when released. Thus, the frustoconical sections 48 are configured with an angle between their outer surface and the longitudinal axis of the connector 10 that is less than the angle between the longitudinal axis and the outer surface of the frustoconical sections 50. As such, the frustoconical sections 48 are more difficult to collapse than the frustoconical sections 50.

One problem with such prior art popoids, however, has been their generally flexible nature even when placed in a bent position. Because each portion of the popoid is formed from the same length and strength of plastic tubing, even the frustoconical portions that are less likely to flex when the popoid is bent, as previously discussed, are somewhat easy to flex themselves and thus do not create as rigid a structure as may otherwise be desirable. Thus, it would be advantageous to provide a popoid connector that is substantially more rigid than popoid connectors known in the art. It would also be advantageous to provide such a popoid connector without increasing the wall thickness of the tubing from which the popoid connector is formed. It would be a further advantage to provide a popoid connector that is substantially more rigid than popoid connectors known in the art that can be manufactured in a manner that is simple and relatively inexpensive compared to manufacturing techniques utilized for manufacturing popoid connectors known in the art.

SUMMARY OF THE INVENTION

Accordingly, a flexible connector, commonly referred to as a popoid connector, for interconnecting a pair of medical devices is provided in accordance with the principles of the present invention. The popoid connector is comprised of an elongate section of tubing having distal and proximal ends for connection to other medical devices. The tubing, while being generally cylindrical in overall shape, is provided with a corrugated portion comprised of a first set of frustoconical members and a second set of frustoconical members. The first set of frustoconical members alternate with and face in an opposite direction to the second set of frustoconical members to form corrugations in the tubing.

In a preferred embodiment, each corrugation is provided with at least one reinforcing rib circumscribing the corrugation. The reinforcing rib is preferably formed into the first set of frustoconical members. The first set of frustoconical members are preferably the set that substantially maintain their relative orientation with the popoid connector is bent or longitudinally collapsed.

Each of the frustoconical members has a slope defined by its outer surface. Preferably, the slope, relative to a longitudinal axis of the tubing, defined by the outer surface of the second set of frustoconical members is greater than the slope defined by the outer surface of the first set of frustoconical members. This variation of slope determines which portions of the popoid collapse when the popoid is bent or longitudinally compressed. That is, the portions that have the least amount of slope have greater structural strength against longitudinal forces applied to the popoid connector and will thus resist collapsing.

In yet another preferred embodiment, the frustoconical members of the popoid connector define an outer diameter and an inner diameter wherein the outer diameter is approximately equal to a diameter of the tubing.

In still another preferred embodiment, the inner diameter of the frustoconical members is substantially equal to a diameter the tubing.

In still another preferred embodiment, the reinforcing rib comprises a ring integral with and circumscribing an outer surface of an associated frustoconical member.

In yet another preferred embodiment, each pair of said frustoconical members defines an apex. The reinforcing rib is preferably positioned proximate to the apex.

In another preferred embodiment, the reinforcing rib comprises a first reinforcing rib positioned proximate to the apex of the frustoconical members and a second reinforcing rib is positioned proximate to the first reinforcing rib.

In yet another preferred embodiment, a third reinforcing rib is positioned proximate to the second reinforcing rib.

In still another preferred embodiment, the reinforcing rib is integrally formed with the apex of the frustoconical members.

In accordance with another aspect of the invention, the reinforcing rib has a width that is substantially greater than its height.

In accordance with yet another aspect of the invention, the reinforcing rib has a width that is substantially equal to its height.

In still another preferred embodiment, the reinforcing rib is formed on the inside of the first set of frustoconical members.

In yet another preferred embodiment, the reinforcing rib is formed into the second set of frustoconical members.

In another preferred embodiment, the reinforcing rib is positioned proximate to a base of the frustoconical member.

In another preferred embodiment, the popoid connector includes a plurality of saucer shaped members integral with and forming a corrugated section along a length of an tubular member. Each of the saucer shaped members define at least one circumscribing rib integrally formed therewith and protruding therefrom.

The circumscribing ribs may be formed on any outer or inner surface of the saucer shaped members depending upon the desired structural rigidity of the resulting popoid connector. Preferably, however, a pair of circumscribing ribs are provided on the exterior surface of each of the saucer sections on the side of the saucer section that resists longitudinal collapsing when the popoid connector is bent or longitudinally collapsed.

Other objects and advantages of the present invention will become apparent upon reading the following detailed description and appended claims, and upon reference to the accompanying drawings.

BRIEF DESCRIPTION OF THE DRAWINGS

FIG. 3 is a side elevational view of a first preferred embodiment of a popoid connector in accordance with the principles of the present invention;

FIG. 4 is an end view of the popoid connector illustrated in FIG. 3

FIG. 5 is a partial side elevational view of the popoid connector illustrated in FIG. 3;

DETAILED DESCRIPTION OF THE PREFERRED EMBODIMENTS

Figure 1:
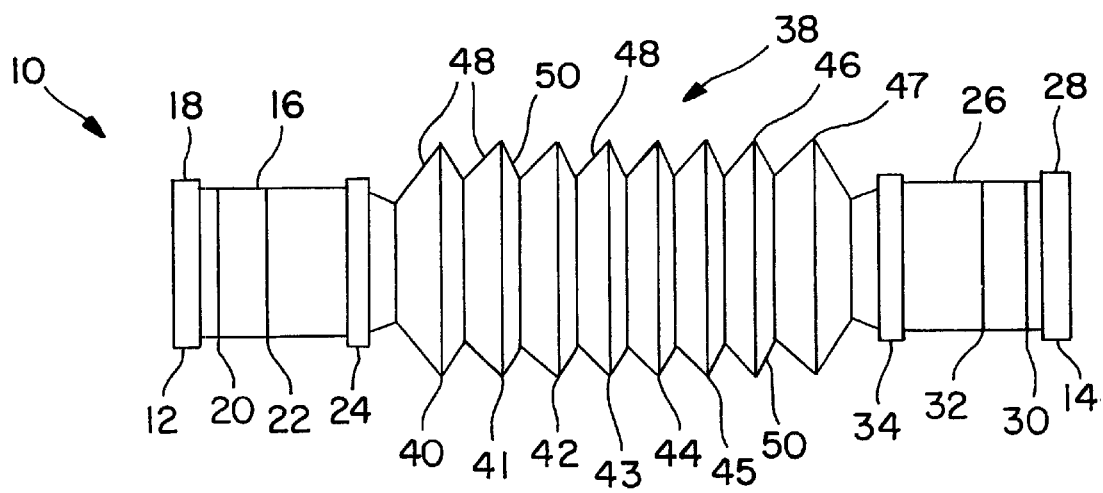
FIG. 1 is a side elevational view of a prior art popoid connector.
Figure 2:
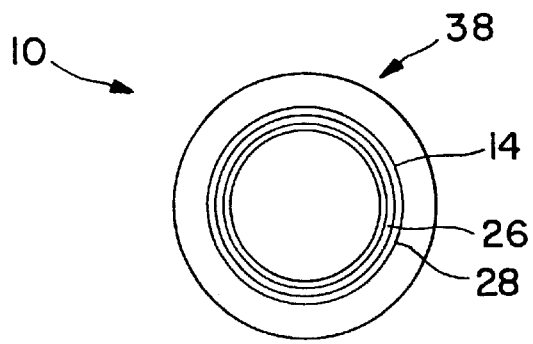
FIG. 2 is an end elevational view of the prior art popoid connector illustrated in FIG. 1.

Reference is now made to the drawings wherein like parts are designated with like numerals throughout. FIGS. 3 and 4 illustrate a flex or popoid connector, generally indicated at 100, in accordance with the principles of the present invention. The popoid connector 100 is similar in configuration as the prior art popoid connector and is thus comprised of an elongate section or member of tubing 102 that has a distal end 104 and a proximal end 106.

Preferably, the popoid connector 100 is formed from an extruded section of plastic, such as polypropylene. The polypropylene may be combined with other materials to modify the properties of the polypropylene. For example, an ethylene alpha-olefin copolymer, like ENGAGE® Polyolefin Elastomer, or an equivalent known in the art, may be added to the polypropylene to increase its flexibility. In addition, various lubricants such as an unsaturated fatty monoamide, e.g., KEMAMIDE® Ultra Fatty Amide (erucamide), or an equivalent thereof, may be added to the polypropylene to give the polypropylene a more lubricious feel when the popoid connector 100 is attached to another device. Other substances may be added to the polypropylene to increase or decrease its stiffness as desired.

A first connection end 108 of the popoid connector 100 is provided at the distal end 104 and includes various features 110 and 112 for connecting to another device, such as an endotracheal tube (not shown). The proximal end 106 has a similarly configured second connection end 114 that includes features 116 and 118 for attachment to another medical device.

Interposed between the first and second connecting ends 108 and 114, respectively, is a popoid section, generally indicated at 120. The popoid section 120 is comprised of a plurality of saucer shaped members or corrugations 121–129 that have a configuration which allows the popoid section 120 to bend and retain its bent orientation when released. Each corrugation 121–129 is comprised of a pair of oppositely facing frustoconical sections, such as the frustoconical sections 130 and 132 of corrugation 122. While the largest and smallest diameters of each frustoconical section 130 and 132 are the same, the longitudinal length of the frustoconical sections 130 and 132 are different. In this example, the frustoconical portion 132 nearest the proximal end 106 of the corrugation 122 has a greater longitudinal length than the longitudinal length of the frustoconical section 130 nearer the distal end 104. When the distal end 104 is forced toward the proximal end 106 along the longitudinal axis of the connector 100, the frustoconical portion 132 substantially maintains its shape, while the frustoconical portion 130 inverts to fit within the associated frustoconical portion 132. Thus, the popoid section 120 will collapse upon itself to shorten the length of the connector 100. A similar condition occurs when the popoid section 120 is bent in a direction relative to the longitudinal axis of the connector 100. As the popoid section 120 is bent, the sides of the frustoconical portions 130 and 132 on the side of the popoid section that are in the direction of the bend will fold upon themselves to shorten the length of the popoid 120 along that side. Conversely, the frustoconical portions 130 and 132 that are on the opposite side to the direction of the bend maintain their pre-bent arrangement such that the length of the popoid section 120 along this side of the popoid section 120 maintains its length.

In order for the popoid to function, the frustoconical section 130 must be able to flex relative to the frustoconical section 132 to be able to invert when the popoid section 120 is bent or collapsed and maintain this inverted position when released. Because it would be difficult to form the popoid 120 from a tubular material that has varying thicknesses to provide additional material and thus additional rigidity to the frustoconical sections 130, the frustoconical sections 130 are configured with a slope or angle between their outer surface and the longitudinal axis of the connector 100 that is less than the angle between the longitudinal axis and the outer surface of the frustoconical sections 132. As such, the frustoconical sections 132 have greater longitudinal strength than the frustoconical sections 130.

Referring now to FIG. 5, the saucer shaped members, such as members 123 and 124, are defined by frustoconical members 134, 135, 136 and 137, respectively. The frustoconical members 134 and 136 face in opposite directions to and alternate with the frustoconical members 135 and 137, respectively. As such, the pair 134 and 135 of frustoconical members define apex 139 and the pair 136 and 137 of frustoconical members define apex 141. The apexes 123 and 124 define an outer diameter of the popoid section 120 which is preferably approximately equal to the diameter of the ends 104 and 106 of the connector 100. By narrowing the outer diameter of the popoid section 120, the popoid section becomes inherently stronger since the material forming the popoid section 120 is expanded to a lesser degree than would be the case if the popoid were configured similar to the popoid connector of FIG. 1.

Each frustoconical member 134, 135, 136 and 137 defines a base which further defines the smallest diameter of the popoid section 120. Those skilled in the art after understanding the principles of the present invention will appreciate the popoid section 120 may be configured similar to that illustrated in FIG. 1 such that the inner diameter defined by that base of the frustoconical sections 134, 135, 136, and. 137, as well as others, is approximately equal to the diameter of the ends 104 and 106 of the popoid connector 100.

Each of the frustoconical members 135 and 137 that resists inversion when the popoid section 120 is longitudinally collapsed is provided with circumscribing reinforcing ribs 140 and 142 that are integrally formed therewith. With reference to apex 139, the rib 140 is configured to have a width that is similar to its height and is positioned adjacent to the apex 139. The second rib 142 has a smaller diameter depending on its location and is spaced from but proximate to the first rib 140. The ribs 140 and 142 provide structural support for the frustoconical portion 135 so that the popoid section 120 will more rigidly hold its position when bent to a position that causes one or more frustoconical portions, such as portion 134 to invert. Thus, the ribs 140 and 142 stop compression of the frustoconical portion 135 perpendicular to the longitudinal axis of the popoid connector.

Figure 6:
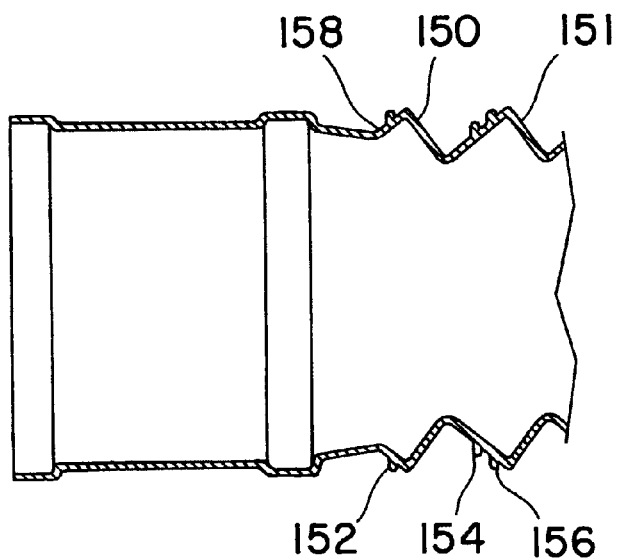
FIG. 6 is a partial cross-sectional side view of a second preferred embodiment of a popoid connector in accordance with the principles of the present invention.

As illustrated in FIG. 6, the saucer section 150 and 151 may include different numbers of ribs 152, 154, and 156 as desired. With specific reference to saucer section 150, because of its shortened frustoconical portion 158, only one reinforcing rib 152 is provided. Preferably, however, each of the other saucer sections, such as saucer section 152 are provided with equal numbers of ribs along a substantial portion of the length of the popoid section to provide equal rigidity throughout.

Figure 7:
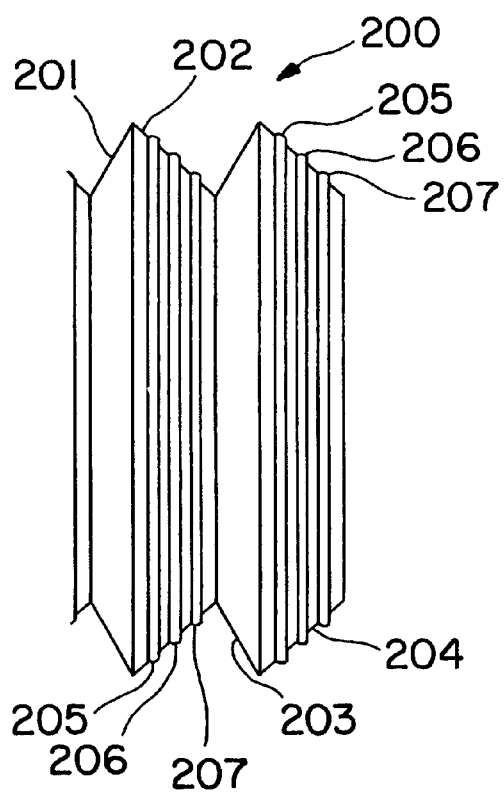
FIG. 7 is a partial elevational side view of a third preferred embodiment of a popoid connector in accordance with the principles of the present invention.

FIG. 7 illustrates yet another preferred embodiment of a portion of a popoid section, generally indicated at 200, in accordance with the principles of the present invention. As with other embodiments herein described, the popoid section 200 is comprised of a plurality of oppositely facing frustoconical portions 201–204. The frustoconical portions 202 and 204 each include three circumferential ribs 205–205, 206, and 207 that circumscribe an outer surface and are integrally formed with the outer surface of the frustoconical portions 202 and 204. The ribs 205, 206, and 207 are preferably molded into the outer surface of the popoid section 200 and are formed from the same material as the rest of the popoid connector. Thus, the ribs 205, 206 and 207 do not add any extra material to the popoid connector while adding strength to the frustoconical portions 202 and 204.

Figure 8:
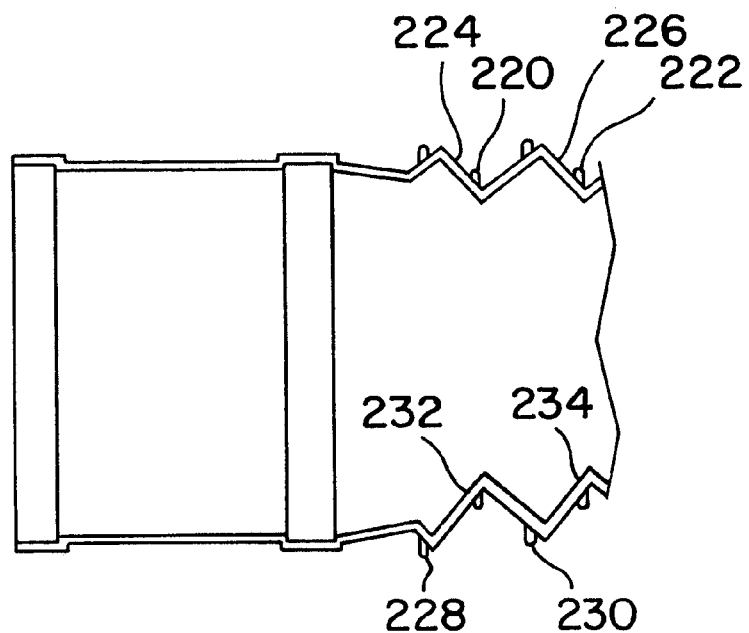
FIG. 8 is a partial cross-sectional side view of a fourth preferred embodiment of a popoid connector in accordance with the principles of the present invention.

As illustrated in FIG. 8, reinforcing rings 220 and 222 may be provided on frustoconical portions 224 and 226, respectively, in addition to ribs 228 and 230 that are similar to those previously described. As such, the reinforcing rings 220 and 222 provide structural support for the frustoconical portions 224 and 226 that will invert when the popoid is bent to a certain degree. As further illustrated, the rings 220 and 222 are positioned proximate the base 232 and 234 of the frustoconical portions 224 and 226, respectively to add structural support to the frustoconical portions 224 and 226 at this location to help maintain the frustoconical portions 224 and 226 in an inverted position.

Figure 9:
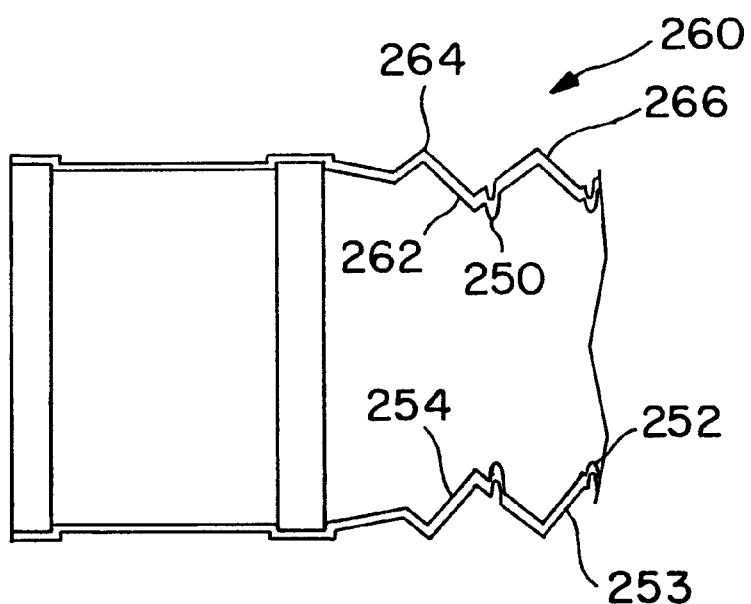
FIG. 9 is a partial cross-sectional side view of a fifth preferred embodiment of a popoid connector in accordance with the principles of the present invention.

In accordance with the principles of the present invention, as illustrated in FIG. 9, reinforcing ribs 250 and 252 are provided an the inside surface 254 of the popoid section, generally indicated at 260. The ribs 250 and 252 are formed by indentations or recesses in the outer surface 253 of the popoid 260. As such, protrusions, rather than recesses, may be formed in a popoid mold (not shown) to form the internal ribs 250 and 252. It is further illustrated that the ribs 250 and 252 are positioned near the base 262 of each saucer section 264 an 266 to cause minimal interference with the collapsing process as the saucer sections 264 and 266 fold relative to one another. Those skilled in the art, after understanding the principles of the present invention that any of the other popoids described herein may be provided with internal stiffening ribs or a combination of internal and external stiffening ribs.

Figure 10:
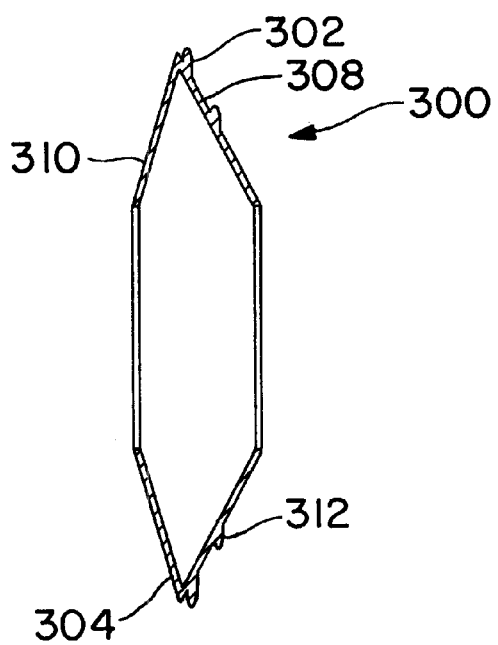
FIG. 10 is a partial cross-sectional side view of a sixth preferred embodiment of a popoid connector in accordance with the principles of the present invention.

Referring now to FIG. 10, a saucer shaped member, generally indicated at 300, a plurality of which would form a popoid, includes a first reinforcing bead or ring 302 which circumscribes the saucer shaped member 300 immediately adjacent the apex 304 of the saucer shaped member 300. The ring 302 may be positioned on either side 308 and 310 of the saucer shaped member 300. An additional circumscribing, reinforcing rib 312 is positioned proximate the ring 304 around the side 308 of the saucer shaped member 300.

Figure 11A:
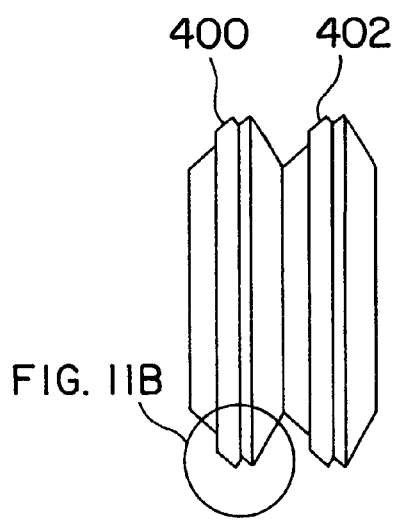
FIG. 11A and 11B are partial elevational side views of a seventh preferred embodiment of a popoid connector in accordance with the principles of the present invention.
Figure 12:
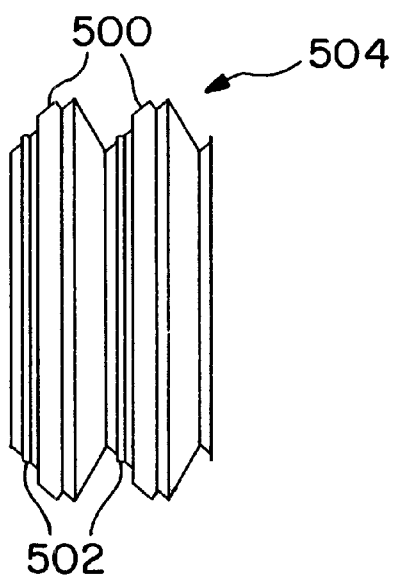
FIG. 12 is a partial elevational side view of an eighth preferred embodiment of a popoid connector in accordance with the principles of the present invention.
Figure 11B:
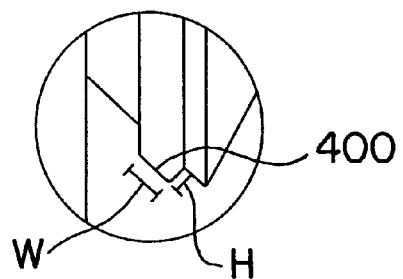

As shown in FIGS. 11A and 11B, the reinforcing ribs 400 and 402 have a width W that is larger than its height H. As such, after understanding the principles of the present invention, the reinforcing ribs in accordance with the present invention may have may different sizes and configurations. In addition, as illustrated in FIG. 12, the various reinforcing ribs, such as ribs 500 and 502, discussed and described herein may be combined in a single popoid section, generally indicated at 504 depending on the desired characteristics of the popoid section 504.

It will be appreciated that the various embodiments specifically described of the present invention are capable of being incorporated in the form of a variety of embodiments, only a few of which have been illustrated and described above. The invention may be embodied in other forms without departing from its spirit or essential characteristics. For example, the reinforcing or stiffening ribs described in conjunction with the illustrated embodiments have generally been shown as having a semicircular or rounded cross-sectional shape. It is understood, however, that the geometric cross-sectional configuration of such ribs, whether external or internal, may include, but is not limited to, rectangular, square, triangular, pointed, and/or any combination thereof and such rib configurations are intended to come within the scope of the appended claims. Thus, the described embodiments are to be considered in all respects only as illustrative and not restrictive, and the scope of the invention is, therefore, indicated by the appended claims rather than by the foregoing description. All changes which come within the meaning and range of equivalency of the claims are to be embraced within their scope.

What is claimed is:

1. A flexible connector for interconnecting a pair of medical devices, comprising:

an elongate tube having distal and proximal ends for connection to other medical devices;

said elongate tube defining a corrugated portion comprised of a first set of frustoconical members and a second set of frustoconical members, said first set alternating with and facing in an opposite direction from said second set to form said corrugated portion;

at least one reinforcing rib formed into a plurality of said first set of frustoconical members, said ribs circumscribing an outer surface of said first set of frustoconical members at a location spaced from an apex between said first and second sets of frustoconical members.

2. The flexible connector of claim 1, wherein the slope defined by the outer surface of said second set of said frustoconical members is greater than the slope defined by the outer surface of said first set of frustoconical members, each of said slopes being relative to a longitudinal axis of said tube.

3. The flexible connector of claim 1, wherein each of said first and second sets of frustoconical members define an outer diameter and an inner diameter, and wherein said outer diameter is approximately equal to a diameter of said proximal and distal ends of said tube.

4. The flexible connector of claim 1, wherein each of said first and second sets of frustoconical members define an outer diameter and an inner diameter, and wherein said inner diameter is approximately equal to a diameter of said proximal and distal ends of said tube.

5. The flexible connector of claim 1, wherein said at least one reinforcing rib comprises a ring integral with said outer surface of said associated frustoconical member.

6. The flexible connector of claim 5, wherein said at least one reinforcing rib has a width that is substantially equal to its height.

7. A flexible connector for interconnecting a pair of medical devices, comprising:

an elongate tube having distal and proximal ends for connection to other medical devices;

said elongate tube defining a corrugated portion comprised of a first set of frustoconical members and a second set of frustoconical members, said first set alternating with and facing in an opposite direction from said second set to form corrugated portion;

at least one reinforcing rib formed into a plurality of said first set of frustoconical members, wherein said at least one reinforcing rib comprises a ring integral with and circumscribing an outer surface of an associated frustoconical member, wherein each pair of said first and second sets of frustoconical members define an apex and wherein said at least one reinforcing rib is positioned proximate to said apex, wherein said at least one reinforcing rib comprises a first reinforcing rib positioned proximate said apex and a second reinforcing rib positioned proximate said first reinforcing rib.

8. The flexible connector of claim 7, further including a third reinforcing rib positioned proximate said second reinforcing rib.

9. A flexible connector for interconnecting a pair of medical devices, comprising:
   an elongate tube having distal and proximal ends for connection to other medical devices;
   said elongate tube defining a corrugated portion comprised of a first set of frustoconical members and a second set of frustoconical members, said first set alternating with and facing in an opposite direction from said second set to form corrugated portion;
   at least one reinforcing rib formed into a plurality of said first set of frustoconical members, wherein said at least one reinforcing rib comprises a ring integral with and circumscribing an outer surface of an associated frustoconical member, wherein each pair of said first and second sets of frustoconical members define an apex and wherein said at least one reinforcing rib is positioned proximate to said apex, wherein said at least one reinforcing rib has a width that is substantially greater than its height.

10. A flexible connector for interconnecting a pair of medical devices, comprising:
    an elongate tube having distal and proximal ends for connection to other medical devices;
    said elongate tube defining a corrugated portion comprised of a first set of frustoconical members and a second set of frustoconical members, said first set alternating with and facing in an opposite direction from said second set to form corrugated portion;
    at least one reinforcing rib formed into a plurality of said first set of frustoconical members, wherein said at least one reinforcing rib is formed on the inside of said first set of frustoconical members.

11. A flexible connector for interconnecting a pair of medical devices, comprising:
    an elongate tube having distal and proximal ends for connection to other medical devices;
    said elongate tube defining a corrugated portion comprised of a first set of frustoconical members and a second set of frustoconical members, said first set alternating with and facing in an opposite direction from said second set to form corrugated portion;
    at least one reinforcing rib formed into a plurality of said first set of frustoconical members, further including another at least one reinforcing rib formed into said second set of frustoconical members.

12. The flexible connector of claim 11, wherein said another at least one reinforcing rib is positioned proximate to a base of a plurality of said second set of frustoconical members.

13. A popoid connector for medical applications, comprising:
    an elongate tubular member having a first connectable end and a second connectable end;
    a plurality of saucer shaped members integral with and forming a corrugated section along a length of said elongate tubular member, the angle of the saucer shaped member nearest the first connectable end being smaller than the angle of the saucer shaped member nearest the second connectable end, each of said angles being relative to the longitudinal axis of the tube, the two angles of each saucer shaped member defining an apex;
    each of said saucer shaped members defining at least one circumscribing rib integrally formed therewith and protruding therefrom, said rib located on an outer surface of the saucer shaped members spaced from said apex.

14. The popoid connector of claim 13, wherein each of said saucer shaped members comprise a first frustoconical portion and a second, oppositely facing frustoconical portion.

15. The popoid connector of claim 14, wherein said at least one circumscribing rib has a width that is substantially equal to its height.

16. A popoid connector for medical applications, comprising:
    an elongate tubular member having a first connectable end and a second connectable end;
    a plurality of saucer shaped members integral with and forming a corrugated section along a length of said elongate tubular member, the angle of the saucer shaped member nearest the first connectable end being smaller than the angle of the saucer shaped member nearest the second connectable end, each of said angles being relative to the longitudinal axis of the tube;
    each of said saucer shaped members defining at least one circumscribing rib integrally formed therewith and protruding therefrom, wherein each of said saucer shaped members comprise a first frustoconical portion and a second, oppositely facing frustoconical portion and defining an apex thereinbetween, wherein a diameter defined by said apex is approximately equal to a diameter of said elongate tubular member.

17. A popoid connector for medical applications, comprising:
    an elongate tubular member having a first connectable end and a second connectable end;
    a plurality of saucer shaped members integral with and forming a corrugated section along a length of said elongate tubular member, the angle of the saucer shaped member nearest the first connectable end being smaller than the angle of the saucer shaped member nearest the second connectable end, each of said angles being relative to the longitudinal axis of the tube;
    each of said saucer shaped members defining at least one circumscribing rib integrally formed therewith and protruding therefrom, wherein each of said saucer shaped members comprise a first frustoconical portion and a second, oppositely facing frustoconical portion and defining an apex thereinbetween, wherein said at least one circumscribing rib comprises a first rib positioned proximate said apex and a second rib positioned proximate said first rib.

18. The popoid connector of claim 17, further including a third rib positioned proximate said second rib.

19. A popoid connector for medical applications, comprising:
    an elongate tubular member having a first connectable end and a second connectable end;
    a plurality of saucer shaped members integral with and forming a corrugated section along a length of said elongate tubular member, the angle of the saucer shaped member nearest the first connectable end being smaller than the angle of the saucer shaped member nearest the second connectable end, each of said angles being relative to the longitudinal axis of the tube;

each of said saucer shaped members defining at least one circumscribing rib integrally formed therewith and protruding therefrom, wherein each of said saucer shaped members comprise a first frustoconical portion and a second, oppositely facing frustoconical portion and defining an apex thereinbetween, wherein said at least one circumscribing rib has a width that is substantially greater than its height.

20. A popoid connector for medical applications, comprising:

an elongate tubular member having a first connectable end and a second connectable end;

a plurality of saucer shaped members integral with and forming a corrugated section along a length of said elongate tubular member, the angle of the saucer shaped member nearest the first connectable end being smaller than the angle of the saucer shaped member nearest the second connectable end, each of said angles being relative to the longitudinal axis of the tube;

each of said saucer shaped members defining at least one circumscribing rib integrally formed therewith and protruding therefrom, wherein said at least one circumscribing rib is formed on the inside of said plurality of saucer shaped members.

21. A popoid connector for medical applications, comprising:

an elongate tubular member having a first connectable end and a second connectable end;

a plurality of saucer shaped members integral with and forming a corrugated section along a length of said elongate tubular member, the angle of the saucer shaped member nearest the first connectable end being smaller than the angle of the saucer shaped member nearest the second connectable end, each of said angles being relative to the longitudinal axis of the tube;

each of said saucer shaped members defining at least one circumscribing rib integrally formed therewith and protruding therefrom, wherein said at least one circumscribing rib includes at least two ribs, one of each formed on both halves of each of said saucer shaped members.

22. The popoid connector of claim 21, wherein one of said two ribs is positioned proximate to a base of each of said saucer shaped members.

23. A popoid connector comprising:

an elongate tubular member having a first connectable end and a second connectable end;

a plurality of saucer shaped members integral with and forming a corrugated section along a length of said elongate tubular member, said saucer shaped members each having an apex defined between oppositely facing frustoconical portions;

each of said saucer shaped members defining at least one circumscribing rib formed on the inside of the plurality of saucer shaped members, said rib located on a surface of one of said frustoconical portions spaced from said apex.

24. A popoid connector comprising:

an elongate tubular member having a first connectable end and a second connectable end;

a plurality of saucer shaped members integral with and forming a corrugated section along a length of said elongate tubular member;

each of said saucer shaped members defining at least one circumscribing rib formed on the inside of the plurality of saucer shaped members, wherein the at least one circumscribing rib includes at least two ribs, one each formed on both halves of each of the saucer shaped members.

* * * * *